United States Patent

Bonomi et al.

[11] Patent Number: 6,069,872
[45] Date of Patent: May 30, 2000

[54] EXPLICIT RATE CONGESTION CONTROL SYSTEM AND METHOD

[75] Inventors: Flavio Bonomi, Palo Alto; Michael K. Wong, San Mateo, both of Calif.

[73] Assignee: Cabletron Systems, Inc., Rochester, N.H.

[21] Appl. No.: 08/975,331

[22] Filed: Nov. 20, 1997

[51] Int. Cl.[7] .................................. H04J 3/16; H04J 3/22
[52] U.S. Cl. .......................... 370/236; 370/232; 370/468
[58] Field of Search .................................. 370/232, 235, 370/236, 412, 468

[56] References Cited

U.S. PATENT DOCUMENTS

| | | | |
|---|---|---|---|
| 5,754,530 | 5/1998 | Awdeh et al. | 370/232 |
| 5,805,577 | 9/1998 | Jain et al. | 370/234 |

*Primary Examiner*—Joseph L. Felber
*Attorney, Agent, or Firm*—Norma Henderson Law Firm of Naren Thappeta

[57] ABSTRACT

An explicit rate congestion control system and method to support available bit rate service in asynchronous transfer mode (ATM) networks is provided. The system and method observe the maximum usage of different connections and incorporates both rate and queue length information to achieve a stable operation of the ATM network. The control of congestion and fairness is separated which permits the system and method to have a common framework to support multiple fairness criteria. The system and method may operate with switches implementing both aggregate and per connection queuing at their ports. In the method, the number of active connections at a bottleneck node is only used to normalize control and to redistribute spare bandwidth during transient conditions and does not affect the steady state fair rate used by each connection.

16 Claims, 12 Drawing Sheets

EXPLICIT RATE CONGESTION CONTROL SYSTEM AND METHOD

BACKGROUND OF THE INVENTION

The invention relates generally to a system and method for controlling congestion in a packet switched communications system and in particular to an explicit rate congestion control system and method for an asynchronous transfer mode (ATM) communications network.

A variety of different communications networks, such as a frame relay network and an asynchronous transfer mode (ATM) network, have been introduced which are intended to carry packetized data between a source and a destination. In an ATM network, data may be communicated between a source and a destination using fixed 53 byte data cells. These fixed-sized data cells travel along data paths known as virtual channels (VCs). Each VC connects a source to a destination and each VC may travel through a plurality of switches that route the data. Each data source may set up either variable bit rate (VBR) or constant bit rate (CBR) virtual channels depending on the bit rates needed by that data source. For a data source transmitting typical digital electronic data traffic such as images or portions of web pages, the amount of traffic may be non-existent at some times and then may be very heavy during other periods of time (e.g., this data traffic is "bursty" since it is communicated in bursts). For data traffic which is bursty and can be delayed some period of time without errors, it is most efficient to dynamically allocate the total available bandwidth of the switch among the VCs connected to the switch that require some of the bandwidth at any particular time. This type of data traffic is known as available bit rate (ABR) traffic since the total available bit rate of a switch is dynamically allocated to each VC connected to the switch depending on the bit rate requirement of that VC and the other VCs connected to the switch.

The Available Bit Rate (ABR) service, as defined by the ATM Forum, is a type of communications service class in which the communications network plays an active role in dynamically changing the bit rate of each source connected to the communications network in order to provide the maximum possible bit rate for each source based on the total numbers of sources attached to the communications network. An ABR source periodically transmits a resource management (RM) cell for every Nrm cells transmitted. When the data cells reach their destination, the RM cells that were sent with the data cells to the destination are sent back to the source. As the RM cells travel through this loop between the source and the destination, any switch along the loop can mark these RM cells to indicate a congestion level and a change in rate for the source. Thus, with the RM cells, the switches can actively control the bit rates of the sources in order to minimize congestion within the communications network.

Two approaches have been defined by the ATM Forum for modifying RM cells within a switch. These include a relative rate marking method and an explicit rate (ER) marking method. In relative rate marking method, a switch will generate a signal to indicate to the source whether it should increase its bit rate, decrease its bit rate or keep its bit rate constant relative to its current bit rate so that no explicit bit rate for any source is specified. Because of the limited amount of information (e.g., increase, decrease or keep your bit rate constant) fed back to the source in this class of marking methods, a VC that passes through more switches between its source and its destination will typically receive less bandwidth since each switch may request a source to decrease its bit rate. This is referred to as the "beat down" problem. With an explicit rate marking method, a switch will compute an appropriate adjusted rate for a particular source and feedback that appropriate rate at which the source should be transmitting so that fairness between all of the sources may be maintained.

Several concerns and problems have to be addressed by any ER marking method including congestion control and a fair resource allocation. Congestion occurs when the combined bit rate of all of the sources connected through a common transmission resource of a switch (e.g. an external port or an internal link) is greater than the capacity of that transmission resource. Resource allocation involves fairly allocating the available bit rate on such transmission resources among several sources. These two factors operate at different time scales. In particular, congestion arises as the resource usage of a switch changes. For example, as high priority sources, such as constant bit rate or variable bit rate sources, start transmitting, ABR cells may queue up at transmission resources. To prevent severe cell loss when queues overflow, the source bit rates need to be reduced quickly. Thus, to control congestion, the ER marking method has to update source rates as each RM cell is received. Fairness, on the other hand, is not as important during transient congestion conditions, but should be attained as the network pulls itself out of congestion and achieves a stable state. Thus, to achieve fairness, source rate changes can take effect on a longer time scale, e.g., on a time scale of the order of the worst round trip control delay. Several fairness criteria have been defined by the ATM Forum. Most conventional methods and systems only support one criterion.

In general, to determine an explicit bit rate for a source, there are two types of information an ER method may use. These include the current bit rate of the source and the queue length (i.e. the number of data cells that are waiting to be transmitted by the transmission resource). In one conventional system and method, the bit rate is the primary information used to adjust the bit rate of the source, whereas in another conventional system and method the queue length is used to adjust the bit rate. Systems do not typically utilize both the queue length and bit rate information in a congestion control system and method to achieve a stable operation of the communications network in the ABR service class.

In addition to the bit rate and queue length, it is also desirable to keep track of the number of active connections competing for bandwidth at the various switch ports since this number is used to allocate bandwidth to individual VCs to achieve "max-min" fairness (i.e., fair distribution of the total available bandwidth between the VCs attached to a switch port). The number of active users connected to a switch may also be used to adjust the control parameters of the switch dynamically. To estimate this number, one conventional system and method requires monitoring the activity of each VC to determine the number of VCs attached to a switch port that are active, which may be difficult to implement. If this number is used directly to allocate resource, as implemented by some conventional systems and methods, the performance of the system will depend on the accuracy of the measurement.

Thus, there is a need for an explicit rate congestion control system and method which avoid these and other problems of known systems and methods, and it is to this end that the present invention is directed.

SUMMARY OF THE INVENTION

In accordance with the invention, a congestion control system and method are provided in which the congestion control is separated from fair bandwidth allocation since these two concepts operate on different time scales. To achieve this separation, the switch will compute periodically a common fair bit rate that may apply to all of the VCs sharing a transmission resource within the switch and which may alter the explicit rate in the RM cells of each different virtual connection (VC) connected to that resource. Depending on the fairness definition adopted, the explicit rate for a particular VC is calculated differently. In particular, on every RM cell received for a VC, the switch adjusts the rate of the particular VC towards the fair rate, taking queue length information into account. To control congestion more effectively, the control parameter (e.g., queue length or bit rate) are normalized by the number of active users. Since the measurement of the number of active users is only used to normalize control parameters, the equilibrium value when fairness is achieved is unaffected by the accuracy of the measurement. The explicit rate congestion control system and method in accordance with the invention exhibits good transient behavior (e.g., handles congestion well), achieves high utilization (e.g., good resource allocation) and has minimal steady state queue length. The invention only involves a few control parameters, which facilitates the management of the switch. In addition, the invention also provides a unique approach to support multiple fairness criteria.

The congestion control method in accordance with the invention is applicable to switches implementing either per class queuing or per VC queuing. In per class queuing, each class of traffic has a single queue regardless of which VC the traffic is received from whereas with per VC queuing, each VC has a queue and an associated queue length. The per VC queuing has the advantage of isolating flows and hence guaranteeing the best quality of service to the each VC. To support ABR on a per VC basis, the system may ensure that the fairness criterion supported by the scheduler of the switch matches that of the flow control method and system. In accordance with the invention, the system and method may take advantage of the fact that the fairness criteria of the scheduler and the congestion system match.

In accordance with the invention, a method for controlling congestion in a network switch is provided that controls the transmission rate of a source connected by a virtual channel to the switch wherein the source is transmitting data at a current cell rate. The method comprises estimating a total number of connections sharing a transmission resource within the switch that are transmitting data through the switch to generate an estimated number of active connections and then determining an allocation of the bandwidth of the transmission resource within the switch for each source connected to that resource in accordance with a predetermined fairness criteria over a predetermined interval. An adjusted transmission rate for a particular source connected to the transmission resource is then calculated based on said current cell rate of the source, said fair bandwidth allocation, said estimated active number of connections and a queue length at the transmission resource. Finally, the adjusted transmission rate is sent backwards to the particular source to explicitly change the transmission rate of the source. A system for controlling the congestion of a network switch by controlling the transmission rate of a source connected to the network switch is also provided.

DETAILED DESCRIPTION OF THE PREFERRED EMBODIMENTS

The invention is particularly applicable to a congestion control system and method for an asynchronous transfer mode (ATM) communications network operating in an available bit rate (ABR) mode and it is in this context that the invention will be described. It will be appreciated, however, that the system and method in accordance with the invention has greater utility. To better understand the invention, a typical ATM network and a typical ATM switch will be briefly described first.

Figure 1:
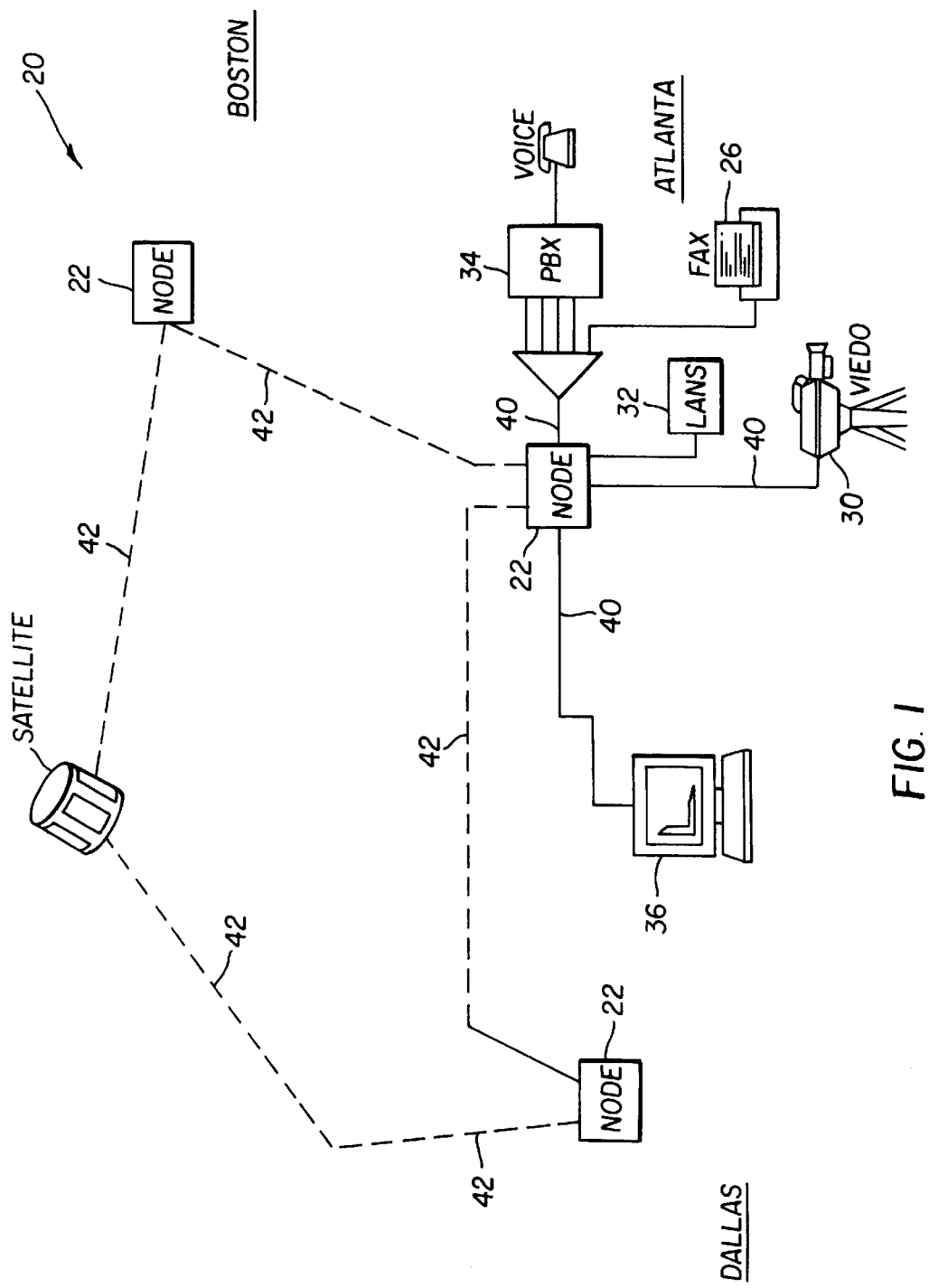
FIG. 1 is a block diagram of a typical asynchronous transfer mode (ATM) communications network.

FIG. 1 is a block diagram of a wide area communications network 20 in which a switch having a congestion control system in accordance with the invention may be used. As shown, the wide area network may connect multiple cities in various geographic locations together, such as Dallas, Boston and Atlanta. The wide area communications system is made up of a plurality of nodes 22 connected together so that data may travel from one node to another. In particular, each node of a system may have a switch that accepts data from an input port, and outputs that data to one or more of a plurality of output ports, as described below. Thus, the switch is basically a system that allows data packets to be routed from any of a plurality of input ports to any one or more of a plurality of output ports. The switch may also have traffic and congestion control systems and may have a system for buffering the data (i.e. queuing data) whenever one or more of a plurality of transmission resources within the switch is temporally not available. Transmission resources may include output ports and internal communications links.

For example, the node in Atlanta receives data from various input sources, such as computer data from a server 36, facsimile transmissions from a facsimile machine 26, voice data from a public broadcast exchange (PBX) system 34 and video signals from a camera 30, and outputs that data to the wide area communications system. As shown, each node of the wide area communications system is connected by a communications link 42. Thus, data from a node in Boston may be transmitted to Dallas via a communications link from the Boston node to a satellite, and another communications link between the satellite and Dallas.

A switch, in accordance with the present invention, may also be used in local area networks to connect a plurality of desktop computers, servers and workstations together. In a local area network system, the distance between the nodes may be smaller, but the same routing of data packets occurs. Now, the node 22 of the network will be described in more detail.

Figure 2:
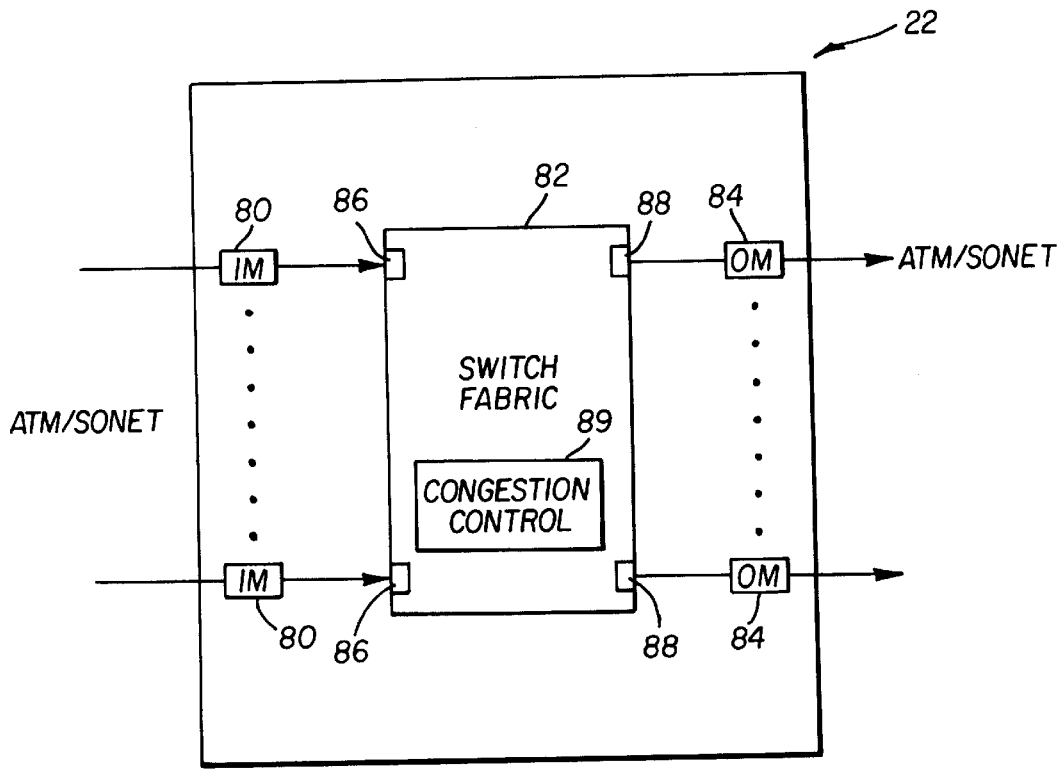
FIG. 2 is a block diagram of a switch within the ATM network that may include a congestion control system in accordance with the invention.

FIG. 2 is a block diagram of a node 22, as shown in FIG. 1. The node 22 may include a plurality of input modules 80, a switch fabric 82 and a plurality of output modules 84. The input modules convert the incoming data signals and break them down into individual ATM cells using the information in the transport overhead. The node 22 may also be used in an Ethernet packet-switched system or any other high speed packet-switched system. As shown, the plurality of input modules transmit data into the switch fabric 82. Typically, the switch fabric may have sixteen input ports 86, but is not limited to any particular number of input ports. The switch fabric, in accordance with the invention, processes a variety of incoming data packets, such as ATM cells, from the input modules, stores the data packet in a memory, and determines the appropriate routing of a particular data packet through the switch to an appropriate output port 88. In addition, the switch fabric may also buffer the incoming data packets, such as ATM cells, in order to equalize the speed of the incoming port and of the outgoing port. For example, if data is entering the switch fabric at 155 Mbps, and the output port is transmitting at 25 Mbps, then the cells must be buffered within the switch fabric in order to equalize the speeds of the ports.

The switch fabric may also have a congestion control system 89 that controls congestion in the switch of ABR traffic by marking resource management (RM) cells from a source with an explicit bit rate for that source, as described below. Once the switch fabric has routed and buffered the incoming data packets from the input modules to the output ports of the switch fabric, these data packets, such as ATM cells, are transmitted out the output modules 84 and back out onto the wide area or local area communications network.

For an ATM network, the outgoing modules may convert the data packets back into aggregate signals, such as an STS-1 synchronized packet envelope. As with the input ports, each output port of the switch fabric has an output module 84 that converts the signals back into the STS-1 format.

In the ensuing discussion, it is assumed that data cells are grouped separately according to their traffic classes so that ABR cells are separate from normal traffic cells, and the ABR cells have a lower priority than real-time traffic. In addition, virtual channels (VCs) of the same traffic class can be scheduled on a first come first serve basis or on a round robin basis. A minimum cell rate (MCR) for each VC is maintained in allocating bandwidth and will not be oversubscribed. However, if one or more sources are not using their MCRs, the residual capacity will be re-allocated. Now, the data format for the transmission of ABR traffic will be described.

Figure 3:
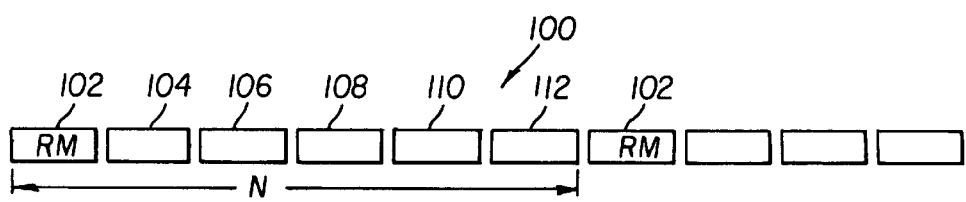
FIG. 3 is a diagram of the format of ABR data transmission through the switch.
Figure 4:
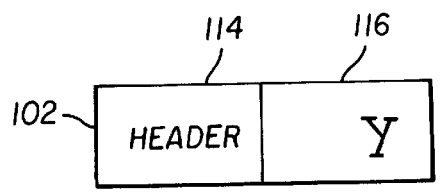
FIG. 4 is a diagram of a resource management cell including the header and the explicit rate.

FIG. 3 is a diagram illustrating an available bit rate (ABR) data stream 100 having a resource management (RM) cell 102 and a plurality of data cells 104–112. As shown, the RM cell may be transmitted every Nrm cells so that an RM cell is periodically transmitted. The RM cell may be received by an ATM switch in the network and the ATM switch may use the RM cell to send information back to the source node to control its bit rate. In particular, the RM cell may be used to indicate to the source node that it should increase, decrease or maintain its bit rate (i.e., relative rate marking) or that it should change its current bit rate to another explicit bit rate (i.e., explicit rate (ER) marking). For example, FIG. 4 illustrates a RM cell 102 that may include, among other items, a header field 114 and an explicit data rate field 116 that contains an explicit bit rate for a particular source that is transmitting data packets through the ATM switch. The congestion control system and method in accordance with the invention utilizes an ER marking method. To describe the congestion control system and method in accordance with the invention, a model of a single virtual channel (VC) within an ATM network will be described.

Figure 5:
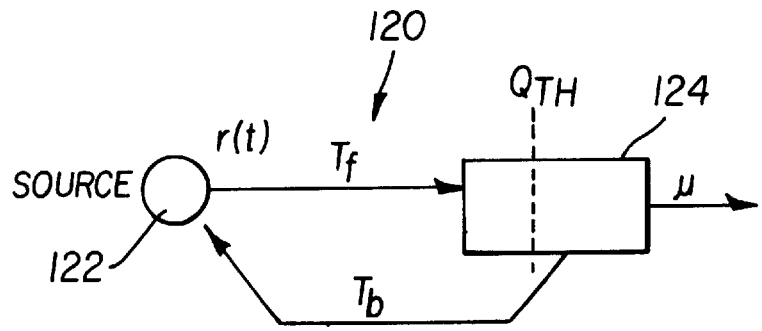
FIG. 5 is a diagram illustrating a single VC rate control model.

FIG. 5 illustrates a model of a single VC 120. As shown, a source node 122 has a source bit rate, r(t), and $\mu$ is the actual service bit rate of the VC which can be considered as constant but unknown. $T_f$ and $T_b$ are the forward and backward time delays associated with the data cells moving from the source to a data cell queue 124 and feeding data back to the source from the queue, respectively. $Q_{TH}$ is the target queue length threshold of the queue 124 (e.g., the desired number of data cells that are in the queue at any time waiting to be sent out). To calculate a new source rate for the source node, which may be calculated by each ATM switch processing ABR traffic, the following equation may be used:

$$r(t+T_b)=\beta_{VC}r(t-T_f)+\alpha_{VC}(Q_{TH}-q_{VC}(t)) \qquad (1)$$

where $r(t+T_b)$ is the adjusted source rate, $q_{VC}(t)$ is the actual queue length of the VC and $\beta_{VC}$ and $\alpha_{VC}$ are constants that are set to optimize network performance for a particular type of data traffic. For example, $\alpha_{VC}=512$ and $\beta_{VC}=0$ for ABR traffic. The congestion control method described below belongs to a class of control methods called a proportional plus derivative control method. The method attempts to keep the number of data cells in the queue close to $Q_{TH}$. Fewer or no cells in the queue indicate that the bit rate assigned to the source is too low. It can be shown that if $0 \leq \beta_{VC} < 1$, and $(1-\beta_{VC}) > \alpha_{VC}(T_f+T_b)$, the system is stable. The sufficient condition is derived from a linearized system, where the barrier to negative queue length is removed. In the original system, the amount of increase of the source rate is constrained to $\alpha_{VC}Q_{TH}$.

There are two possible equilibrium points. If $Q_{TH} > \mu(1-\beta_{VC})/\alpha_{VC}$, then
$r(\infty) = \mu$, (i.e., the adjusted rate is equal to the available bit rate) and $q_{VC}(\infty) = Q_{TH} - \mu(1-\beta_{VC})/\alpha_{VC}$.
Otherwise,
$r(\infty) = Q_{TH}\alpha_{VC}/(1-\beta_{VC}) < \mu$ and $q_{VC}(\infty) = 0$ (i.e., no queue length).

To achieve high utilization, the threshold $Q_{TH}$ needs to be chosen properly. Now, suppose we can estimate $\mu$, and $Q_{TH}$ is equal to $\mu(1-\beta_{VC})/\alpha_{VC} + \epsilon$ where $\epsilon$ is an error value. Then equation (1) can be written as $$r(t+T_b) = \beta_{VC} r(t-T_f) + (1-\beta_{VC})\mu + \alpha_{VC}(\epsilon - q_{VC}(t)). \quad (2)$$

A special case of interest is when $\epsilon$ is equal to zero. In this case, $r(\infty) = \mu$, and $q_{VC}(\infty) = 0$ (i.e., the adjusted bit rate is equal to the available bit rate and the actual queue length is zero). The first two terms of equation (2) can be interpreted as a smoothing operation to approach the desired rate $\mu$, and the last term as a correction from the equilibrium queue value to control congestion. When $\beta_{VC}$ equals zero, the scheme reduces to the class of proportional control, and there is no smoothing operation towards the estimated rate. As discussed in the simulation section, we found the behavior of the scheme using $\beta=0$ to be adequate in practice. This provides a simpler implementation since we do not have to maintain per VC information.

In some switches, the exact queue length may not be available. For example, this is the case in some earlier generation ATM switches, where the only congestion information available is whether the queue is above or below a threshold. For these systems, we can approximate Equation (2) by $$r(t+T_b) = \beta_{VC} r(t-T_f) + (1-\beta_{VC})\mu - \alpha_{VC} d(t), \quad (3)$$

where $d(t)$ is the duration (measured in cell time) the queue length stays above the threshold and $d(t)$ is reset to zero when the queue drops below the threshold. Thus, our invention will be suitable to compute the adjusted bit rates for both switches that do and do not maintain actual queue length information. The adjusted bit rate may be further calculated, as described below, but first an estimate of the number of users sharing a transmission resource within the switch will now be described.

Consider over a time interval of length L, a single VC is sending at its current cell rate (CCR). The expected number of RM cells received for this VC is equal to:

$$RM\ No. = CCR \times L/Nrm. \quad (4)$$

where one RM cell is sent for every Nrm cells transmitted. This forms the basis of the estimator. If all VCs are sending at their respective CCRs, then over a time interval of length L, for all RM cells received, we calculate the number of active connections, Na, as $$Na = \Sigma_j (Nrm/L) \times (1/CCR_j), \quad (5)$$

where $CCR_j$ is the current cell rate for the jth RM cell received during the time interval. This equation becomes clear if we rewrite the summation as $$Na = \Sigma_i n_i \times (Nrm/L) \times (1/CCR_i), \quad (6)$$

where the summation is now taken over all the VCs, $n_i$ and $CCR_i$ are, respectively, the number of RM cells received for $VC_i$, and the current cell rate of $VC_i$. In the last summation, each VC contributes a term which is the ratio between the actually measured number of RM cells received and the expected number of RM cells received during an interval of length L. For VCs sending at exactly their CCR, this ratio should be close to 1. For VCs sending at a rate less than their respective CCR, their contribution will be proportionally less. Non-active VCs will not contribute to the summation. Thus, Na gives an accurate estimate of the number of active connections.

If we associate a weight to each VC, as in weighted fairness, we need the notion of a normalized effective number of users, $Na_{NOR}$. Instead of using Equation (5), we calculate the following quantity, $Na_{NOR}$ $$Na_{NOR} = \Sigma_j (Nrm/L) \times (w_{VC(j)}/CCR_j), \quad (7)$$

where $w_{VC(j)}$ is the weight assigned to the VC of the j-th RM cell.

As discussed in the following, Na will be used to calculate the per VC allocation from the available spare capacity. Thus to avoid over allocation, the value of Na has to be lower bounded to 1. To reduce measurement noise, the computation of Na and $Na_{NOR}$ has to be averaged as follows:

$$Na_{n+1} = \gamma_{Na} Na_n + (1-\gamma_{Na}) \max[\Sigma_j(Nrm/L) \times (1/CCR_j), 1], \quad (8)$$

$$Na_{NORn+1} = \gamma_{Na} Na_{NORn} + (1-\gamma_{Na}) \max[\Sigma_j(Nrm/L) \times (w_{VC(j)}/CCR_j), 1], \quad (9)$$

where $\gamma_{Na}$ is an averaging constant and $0 \leq \gamma_{Na} \leq 1$. The term "$\max[\Sigma_j(Nrm/L) \times (1/CCR_j), 1]$" is the measured Na, or $Na_{RAW}$, and "$\max[\Sigma_j(Nrm/L) \times (w_{VC(j)}/CCR_j), 1]$" is the measured $Na_{NOR}$, or $Na_{NOR-RAW}$. Now that both the number of active connections and the normalized number of users have been determined, the explicit rate methods in accordance with the invention will be described.

The explicit rate method in accordance with the invention is based on an iteration, which is performed once every predetermined interval of time, that computes the common fair component of bandwidth to be used in the control method. The length of the time interval has to be long enough so that the measurement is sufficiently accurate, but not too long to slow down the response of the system. The basic form of the iteration is the following:

$$FS_{n+1} = FS'_n + \Omega, \quad (10)$$

where $FS_{n+1}$ is the fair share of bandwidth applied at interval $n+1$, $FS'_n$ is the fair share of bandwidth estimated at interval n, $\Omega$ is a correction term. The choice of $\Omega$ depends on how the scheduler supports multiple traffic types. Let us first consider a simple priority scheme. Typically constant bit rate (CBR) and variable bit rate (VBR) traffic will have a higher priority than ABR traffic, and unspecified bit rate (UBR) traffic will be of the lowest priority. A simple bandwidth management scheme can allocate a limited percentage of bandwidth to carry UBR traffic and share the remanding bandwidth amongst the higher priority traffic (e.g., CBR, VBR and ABR). To achieve this goal in a priority system, one has to limit the total bandwidth usage of ABR streams. In this environment, one choice of $\Omega$ is $$\Omega = (C' - A_n)/Na_{RAW}, \quad (11)$$

where C' is the total capacity available to ABR traffic and other higher priority traffic, and $A_n$ is the (measured) arrival cell rate of all ABR and higher priority classes during interval n. UBR traffic is not included in $A_n$. If a scheduler can guarantee the bandwidth to a traffic class, one can use the following correction term.

$$\Omega = (C - D_n)/Na_{RAW}, \quad (12)$$

where, C is the link capacity, $D_n$ is the total departure cell rate measured at n. The term $(C-D_n)$ represents the spare capacity available. How the fair share of bandwidth is defined and estimated will depend on the fairness criteria chosen. The specifics for each fairness criteria which will be described below. With the congestion control method introduced above using the queue length, the choice of using spare capacity rather than the difference between link capacity and arrival rate provides smoother transient behavior. Below, we assume that the scheduler can guarantee a minimum percentage of bandwidth to different traffic class and investigate the performance of equation (10) using equation (12).

Since the fair share component needs to be averaged to reduce measurement noise, we can use the measured Na, $Na_{RAW}$, to improve the responsiveness of the system. Thus, the fair share component is updated as follows:

$$FS_{n+1} = \gamma_{FS} FS_n + (1-\gamma_{FS})[FS'_n + (C-D_n)/Na_{RAW}], \quad (13)$$

where $\gamma_{FS}$ is an averaging constant and $0 \leq \gamma_{FS} \leq 1$.

The above equation resolves the longer term fairness issue. To control congestion, and possibly adjust from any error in the estimation of the fair share of bandwidth, the ABR sources have to be adjusted on a shorter time scale. For every Nrm cells transmitted, one RM cell will be injected into the cell stream. The explicit rate carried in the RM cell should be adjusted according to the fair rate and the congestion level. Here we rely on the flow control mechanism described above.

When the scheduler enforces the same fairness definition as the ABR flow control, the results developed above can be applied directly at the per VC level. In particular, using equation (2) above, the following scheme for the computation of the explicit rate, ER, for a VC when an RM cell for that VC is received at a switch port may be determined:

$$ER = \beta_{VC} CCR + (1-\beta_{VC}) f_{VC}(FS_n) + \alpha_{VC}(\epsilon - q_{VC}(t)), \quad (14)$$

where $q_{VC}(t)$ is the individual VC queue length and $f_{VC}(FS_n)$ gives the target rate of the VC. Here, $f_{VC}$ is variable and its values are different for different fairness criteria. CCR is the most up to date value for the CCR of the VC at the switch port. The CCR is determined based on the RM cells of the corresponding VCs traveling in either the forward or backward direction, based on the chosen implementation. Similarly, ER may, depending on the implementation, be updated within RM cells traveling in either direction.

However, since the scheduler is not always using the same fairness definition as the end to end flow control, we consider next a version of the method which only relies on the global queue length for the ABR class, q(t). In this case, we use a normalized queue length to determine the explicit rate (ER) as follows:

$$ER = \beta_{VC} CCR + (1-\beta_{VC}) f_{VC}(FS_n) + \alpha_{VC}(\epsilon - q(t))/Na. \quad (15)$$

A FIFO scheduling discipline is used within the ABR streams. If the fair share is overestimated, then a queue will build up and the cell rate of the VCs will be brought down by the congestion control mechanism. If it is underestimated, the fair share will be increased by the spare capacity component until full utilization is achieved. At steady state, $(\epsilon - q(t))$ is zero and CCR equals $f_{VC}(FS_n)$. Since all VCs use the same fair share component, fairness will be achieved when steady state is reached. Below, we evaluate the stability of the system through simulation. The variable Na is used in allocating the spare capacity and normalizing the congestion control. In steady state, it has no effect on the fair share that each VC receives. Therefore, we may use the approximations introduced below for Na. Now, a complete description of the generic method has been provided.

Before discussing the methods for each of the different fairness criteria, an important property of max-min fairness which applies when there is no minimum cell rate (MCR) support is provided. In particular, when max-min fairness is achieved, at a node where the VC is bottlenecked, the VC's rate will be at least as large as that of any other VC that is bottlenecked at that node. If a VC is not using its full available cell rate, or is even sending below its MCR, the residual capacity will be shared amongst the other active connections sharing the link. This is important in supporting data connections, where MCR may not be accurately estimated. This may cause more transient oscillation when sources with large MCR values start transmitting. If the transient is not acceptable, one can reduce the total capacity that can be allocated to the port. This can be achieved by reducing the value C in our formulation. With this in mind, we apply the max-min principle to the residual capacity, including the portion of MCR that is not used.

Now, the congestion method to determine fair share as applied to three examples of different fairness criteria will be described. The first fairness criteria selects, as the fair bit rate for each VC, the greater of the MCR of the VC or the fair share of the VC.

In the case when MCR is not supported, the property max-min fairness described above suggests that an estimate for the fair share is the maximum rate of all the VCs observed over an interval. The use of the maximum current cell rate is known.

Figure 6:
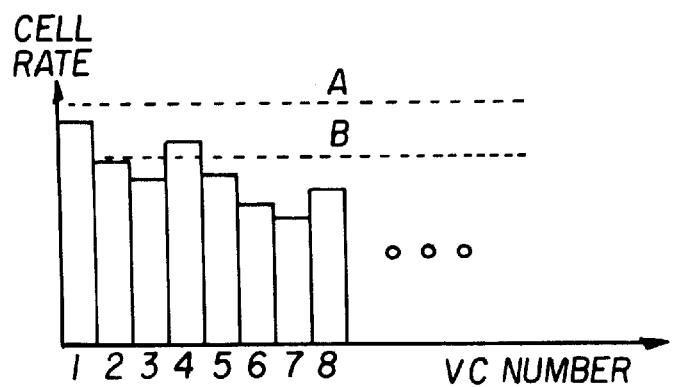
FIG. 6 is a chart illustrating an example of a comparison of the fair rate and the minimum cell rate (MCR) values for a plurality of VCs.

To support MCR, consider the example shown in FIG. 6 in which the MCRs of a plurality of VCs are shown. If the fair share of bandwidth is at level A, the fair rate is greater than the MCRs of all VCs. In this case, MCR has no effect. On the other hand, if the fair bandwidth is at level B, VC 1 and 4 can send at a rate greater than the fair rate of the other connections. In this case, VC 1 and 4 are no longer regulated by the congestion control mechanism, since they can send up to their MCR. In fact, as far as bandwidth usage is concerned, they can be considered as CBR connections.

We therefore propose the following method to estimate the fair share of bandwidth. During an interval, measure the maximum CCR ($CCR_{MAX}$) over the VCs such that the VC's CCR is larger than its MCR. Then, $$FS'_n = CCR_{MAX}, \quad (16)$$

and $$f_{VC}(FS_n) = FS_n. \quad (17)$$

Note that the required information is embedded inside RM cells. Now, a method for a second fairness criterion is described.

In this fairness criterion, the bandwidth that needs to be regulated is a VC's current cell rate in excess of its MCR. Following the same line of reasoning as in the last section, we propose the following method for estimating the fair share. Max-min criteria is used in allocating the residual bandwidth. First, the maximum value over all VCs sharing the same transmission resource within the switch, e.g. a switch port, of the difference between the current cell rate and the minimum cell rate of each VC is measured over an interval. This maximum is denoted as $(CCR-MCR)_{MAX}$. Then, $$FS'_n = (CCR-MCR)_{MAX}, \quad (18)$$

and $$f_{VC}(FS_n) = MCR_{VC} + FS_n. \quad (19)$$

Now, a method with a third fairness criteria that uses a weighted allocation is described.

In a weighted allocation, the fair rate, $r_i$, of VC i is proportional to its predefined weight, $w_i$; i.e. $r_i = w_i \times$ (available capacity)$/\Sigma_k w_k$. When fairness is achieved, the rate of each VC may be different, but ($r_i/w_i$) should be equal. Here we will need the normalized number of active users ($Na_{NOR}$). Now, equations (13) and (15) above may be written as follows:

$$FS_{n+1} = \gamma_{FS} FS_n + (1 - \gamma_{FS})[FS'_n + (L - D_n)/Na_{NOR-RAW}], \quad (20)$$

$$ER = \beta_{VC} CCR + (1 - \beta_{VC}) f_{VC}(FS_n) + \alpha_{VC}(\epsilon - q(t)) w_{VC}/Na_{NOR}. \quad (21)$$

During an interval, we measure the maximum value of the current cell rate of each VC divided by the weight of that VC for all connections sharing a common transmission resource. This maximum value is denoted by $CCR_{NOR-MAX}$. Then, $$FS'_n = CCR_{NOR-MAX}, \quad (22)$$

and $$f_{VC}(FS_n) = w_{VC} FS_n. \quad (23)$$

Now the method as applied to each fairness criteria to determine a fair share has been described. A summary of the methods to determine fair share is provided in Table 1 in which for initialization, we set $FS_0$ to a fraction of the link capacity C, and n to zero.

The main computational block in the design is the computation of Na, which requires a floating point division per RM cell. While this can be implemented with special hardware, the use of Na is in normalizing control parameters only. The equilibrium fair allocation is not affected by the accuracy of the measurement. This allows us to use approximations to this estimation of Na. As above, different fairness definitions may call for different approximations of Na and each will be described below.

When MCR is not supported and a fair rate, R, is known, then Na for an interval L can be approximated by $$(Nrm/L) \times (\text{\# of RM cell received in } L)/R. \quad (24)$$

This estimating operation needs to be performed once every interval of length L because for every RM cell received, we only need to increment a counter. However, when MCR is supported, equation (24) needs to be modified. In the following, we describe one approximation of Na for each fairness type.

For the first fairness criterion, when the fair share of the VC is below the MCR value of a VC, from a bandwidth utilization viewpoint, the VC can be treated as a constant bit rate connection. Hence, the VC's contribution shall be excluded when estimating Na. Thus, equation (24) can now be written as $$(Nrm/L) \times (\text{\# of RM cell received in L such that CCR>MCR})/CCR_{MAX}. \quad (25)$$

For the second fairness criterion, i.e. (MCR+fair share), a simple choice for R is the running average of CCR. This is similar to the mean available cell rate (MACR) discussed in the literature. Here a moving average of CCR, $R_{CCR}$, is maintained.

TABLE 1

| Fairness Criterion | Forward RM Cell: Fair Share Estimate, Active VC Count, and Per VC CCR. | Backward RM Cell: Calculate Explicit Rate. | Per Interval: Compute Fair Share. |
|---|---|---|---|
| 1 | If((CCR > MCR) & (CCR > $CCR_{MAX}$)) $CCR_{MAX}$ = CCR. Accumulate (Nrm/L) × (1/CCR) to $Na_{RAW}$. Update Per VC CCR. | ER = $\beta_{VC}$CCR + (1 − $\beta_{VC}$) $FS_n$ + $\alpha_{VC}$ ($\epsilon$ − q(t))/$Na_n$ | $FS_{n+1} = \gamma_{FS} FS_n + (1 - \gamma_{FS})$ [$CCR_{MAX} + (C - D_n)/\max(Na_{RAW}, 1)$] $Na_{n+1} = \gamma_{Na} Na_n + (1 - \gamma_{Na})\max(Na_{RAW}, 1)Na_{RAW}]$ $Na_{n+1} = \gamma_{Na} Na_n + (1 - \gamma_{Na}) Na_{RAW}$ n = n + 1 $Na_{RAW}$ = 0 |
| 2 | If((CCR − MCR) > (CCR − MCR)$_{MAX}$) (CCR − MCR)$_{MAX}$ = CCR − MCR Accumulate (Nrm/L) × (1/CCR) to $Na_{RAW}$. Update Per VC CCR. | ER = $\beta_{VC}$CCR + (1 − $\beta_{VC}$) (MCR + $FS_n$) + $\alpha_{VC}$ ($\epsilon$ − q(t))/$Na_n$ | $FS_{n+1} = \gamma_{FS} FS_n + (1 - \gamma_{FS})$ [(CCR − MCR)$_{MAX}$ + (C − $D_n$)/ $\max(Na_{RAW}, 1)$] $Na_{n+1} = \gamma_{Na} Na_n + (1 - \gamma_{Na})\max(Na_{RAW}, 1) Na_{RAW}$ $Na_{n+1} = \gamma_{Na} Na_n + (1 - \gamma_{Na}) Na_{RAW}$ n = n + 1 $Na_{RAW}$ = 0 |
| 3 | If(CCR/$w_{VC}$) > $CCR_{NOR-MAX}$) $CCR_{NOR-MAX}$ = CCR/$w_{VC}$ Accumulate (Nrm/L) × ($w_{VC}$/CCR) to $Na_{NOR-RAW}$. Update Per VC CCR. | ER = $\beta_{VC}$ CCR + (1 − $\beta_{VC}$)($w_{VC}$ × $FS_n$) + $\alpha_{VC}$($\epsilon$ − q(t))$w_{VC}$/ $Na_{NOR-n}$ | $FS_{n+1} = \gamma_{FS} FS_n + (1 - \gamma_{FS})$ [$CCR_{NOR-MAX}$ + (C − $D_n$)/ $\max(Na_{NOR-RAW}, 1)$] $Na_{NOR-RAW}$ $Na_{NOR-n+1} = \gamma_{Na} Na_{NOR-n} + (1 - \gamma_{Na})\max(Na_{NOR-RAW}, 1)$ $Na_{NOR-RAW}$ n = n + 1 $Na_{NOR-RAW}$ = 0 |

$$R_{CCR} = \gamma_{CCR} R_{CCR} + (1 - \gamma_{CCR}) CCR, \quad (26)$$

where $\gamma_{CCR}$ is a constant between 0 and 1. Thus, equation (24) can now be written as, $$(Nrm/L) \times (\# \text{ of RM cell received in } L)/R_{CCR}. \quad (27)$$

Finally, for the third fairness criterion (i.e., the weighted fair share) to approximate $Na_{NOR}$, we first calculate the following quantity over an interval L:

$$\Sigma_j (Nrm/L) w_{VC(j)}, \quad (28)$$

where j indexes the RM cells received over an interval L. An estimate for the normalized rate would be $CCR_{NOR-MAX}$. Equation (24) can be written as, $$\Sigma_j (Nrm/L) w_{VC(j)} / CCR_{NOR-MAX}. \quad (29)$$

Now, simulations of each of these methods for the various fairness criteria are described.

The simulation model is developed on the Opnet simulation platform. At the switch, we assume that the information in the forward RM cells will be used to update the method, and the backward RM cells will be marked with the new explicit rate. This limits the control loop delay. In addition, sources will take the ER values returned from the RM cells as their CCR values.

Figure 7:
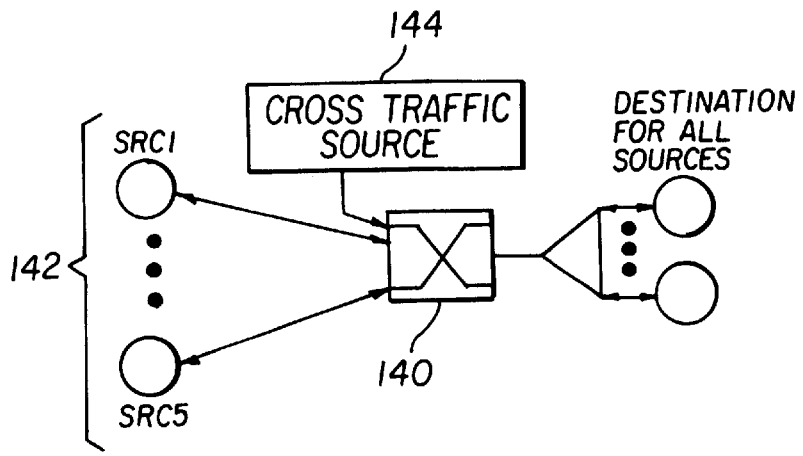
FIG. 7 is a diagram illustrating a first example of a network configuration that may operate with the system and method in accordance with the invention.
Figure 8A:
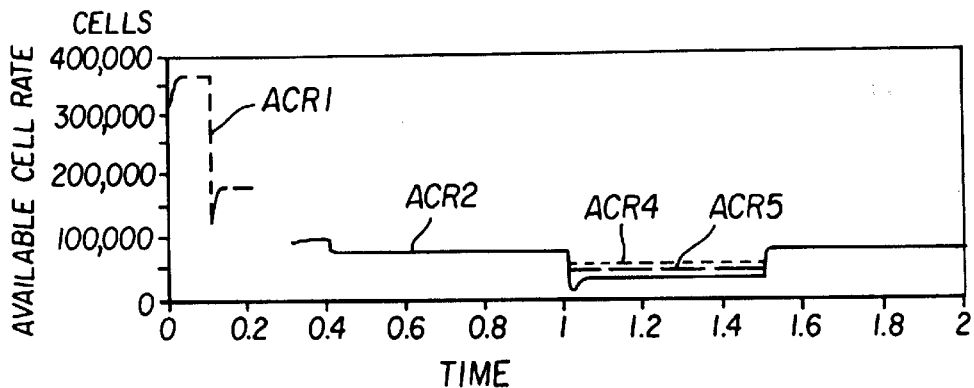
FIGS. 8A, 8B and 8C are charts illustrating the available cell rate, the switch port queue length and the utilization for the network of FIG. 7 using a first fairness criteria.
Figure 8B:
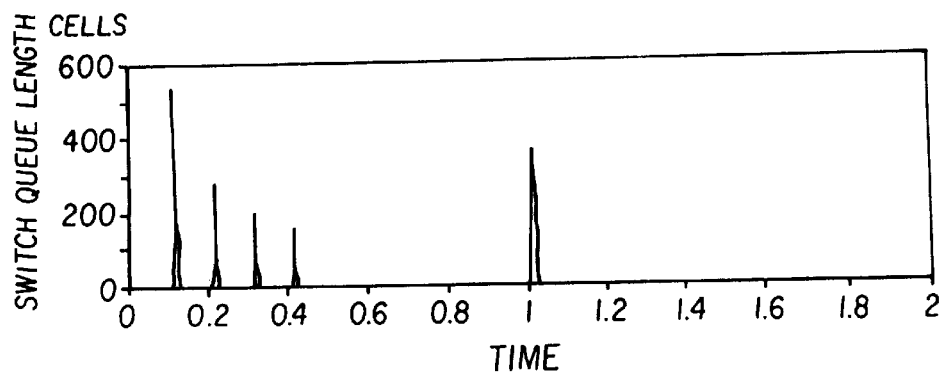
Figure 8C:
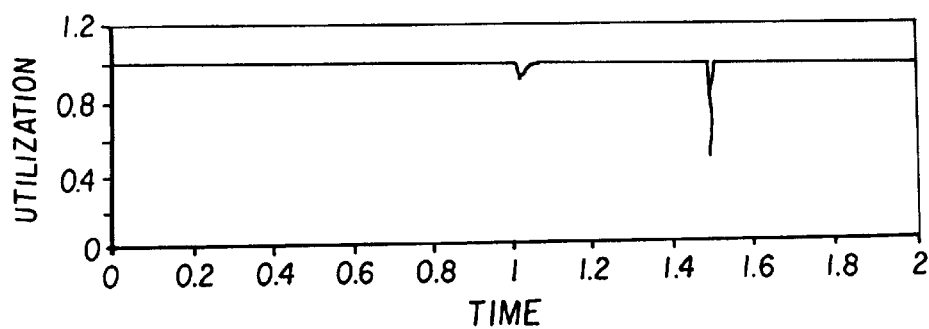
Figure 9A:
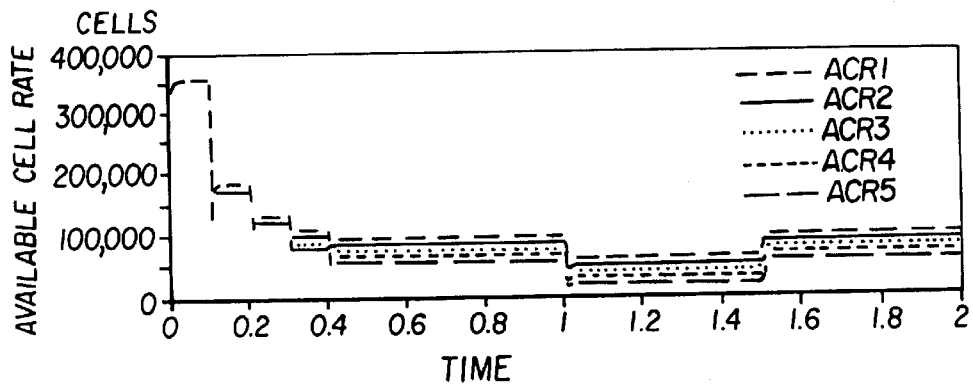
FIGS. 9A, 9B and 9C are charts illustrating the available cell rate, the switch port queue length and the utilization for the network of FIG. 7 using a second different fairness criteria.
Figure 9B:
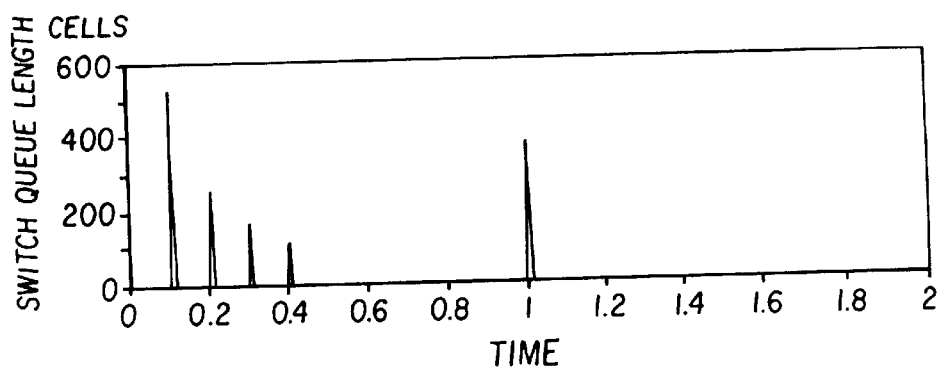
Figure 9C:
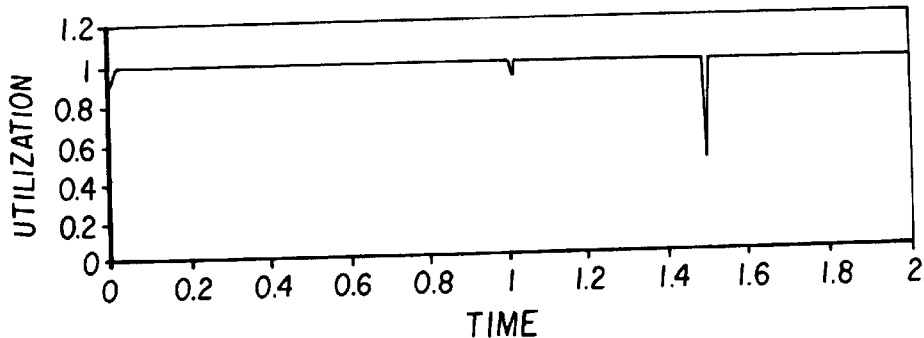
Figure 10A:
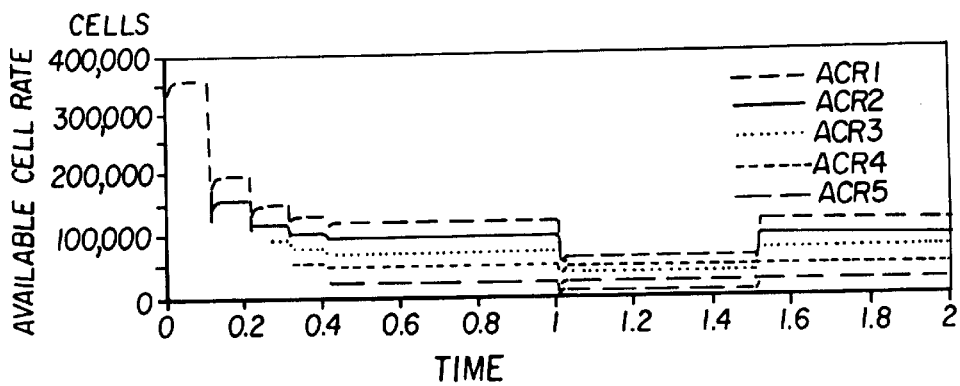
FIGS. 10A, 10B and 10C are charts illustrating the available cell rate, the switch port queue length and the utilization for the network of FIG. 7 using a third fairness criteria.
Figure 10B:
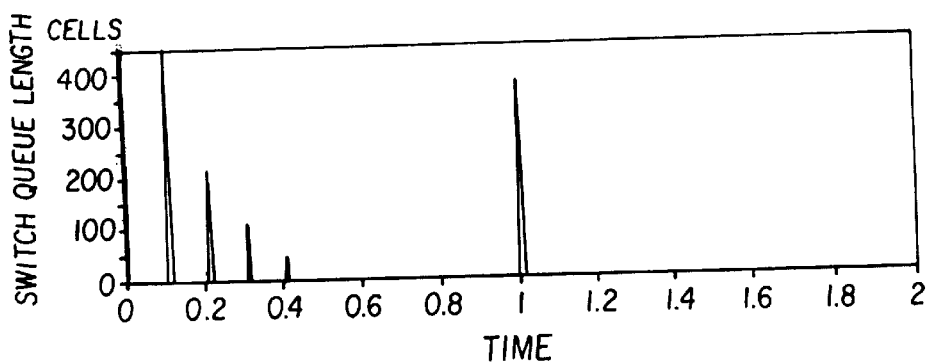
Figure 10C:
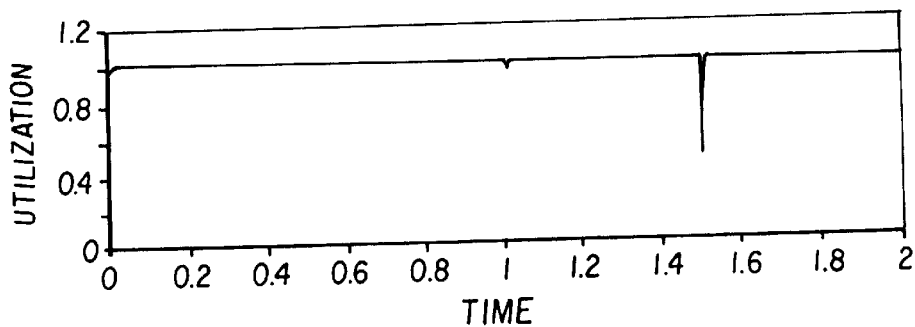

A first example of a network configuration is shown in FIG. 7. The network comprises a single bottleneck switch node 140. There are a group of five sources 142, such as SRC1 and SRC5 with varying propagation delays to the switch. The propagation delay between the switch and the destinations is 0.1 ms. All links in the network have a rate of 155 Mbps. A cross traffic source 144 is a CBR stream that turns on at time 1 s, and turns off at time 1.5 s. While it is on, the CBR source sends at 50% of the link capacity. The CBR cross traffic has a higher priority than the ABR traffic. There are two variants of the switch scheduler for the ABR traffic including a first in first out (FIFO) scheduler and a per VC self-clock fair queuing (SCFQ) scheduler. In the latter case, one can choose the scheduler parameters to match that of the weighted fairness criterion. The following two tables summarize the simulation parameters for this network including the initial cell rate (ICR). Equations (8) and (9) above are used to estimate the effective number of active connections.

TABLE 2

Configuration parameters for network configuration 1.

| Source ID | Source to Switch Delay (ms) | MCR (Cell/s) | ICR (Cell/s) | Start Time (s) | Weight (Fairness 3 only) |
|---|---|---|---|---|---|
| 1 | 0.5 | 50000 | 100000 | 0 | 5 |
| 2 | 0.4 | 40000 | 80000 | 0.1 | 4 |
| 3 | 0.3 | 30000 | 60000 | 0.2 | 3 |
| 4 | 0.2 | 20000 | 40000 | 0.3 | 2 |
| 5 | 0.1 | 10000 | 20000 | 0.4 | 1 |

TABLE 3

Parameters for the method for network configuration 1.

| | |
|---|---|
| $\alpha_{VC}$ | 512 |
| $\beta_{VC}$ | 0 |
| $\gamma_{FS}$ | 0.75 |

TABLE 3-continued

Parameters for the method for network configuration 1.

| | |
|---|---|
| $\gamma_{Na}$ | 0.875 |
| $\epsilon$ | 0 |
| Nrm | 32 |
| L | 1 ms |

The next figures show the simulation results of the ACR (available cell rate) of different stations (VCs), the queue length and the utilization at the bottleneck node.

Figure 11A:
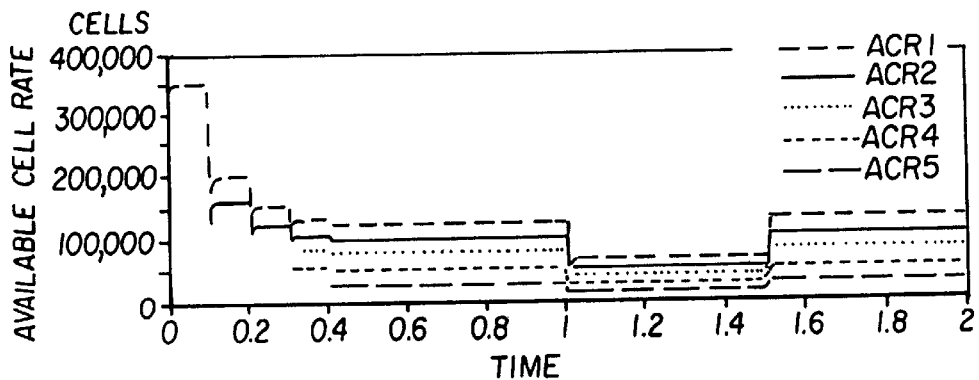
FIGS. 11A, 11B, and 11C are charts illustrating the available cell rate, the switch port queue length and the utilization for the network of FIG. 7 using a weighted fairness with per virtual channel (VC) self-clock fair queuing.
Figure 11B:
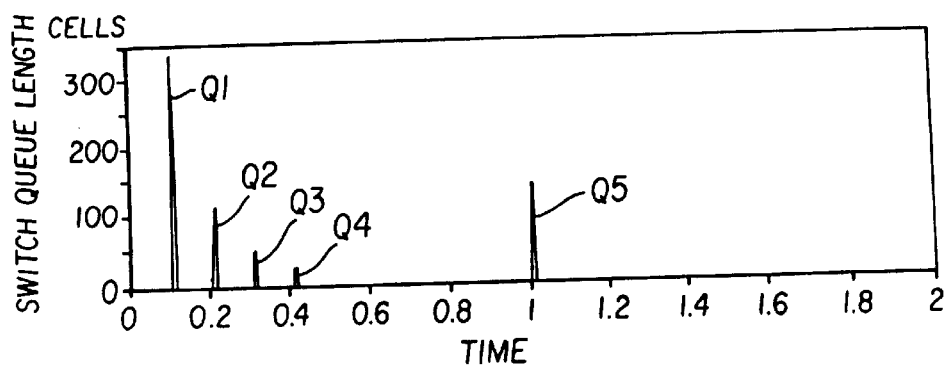
Figure 11C:
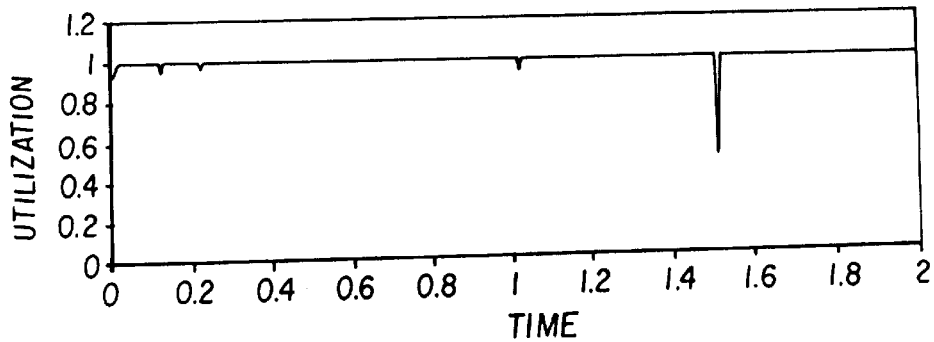
Figure 12A:
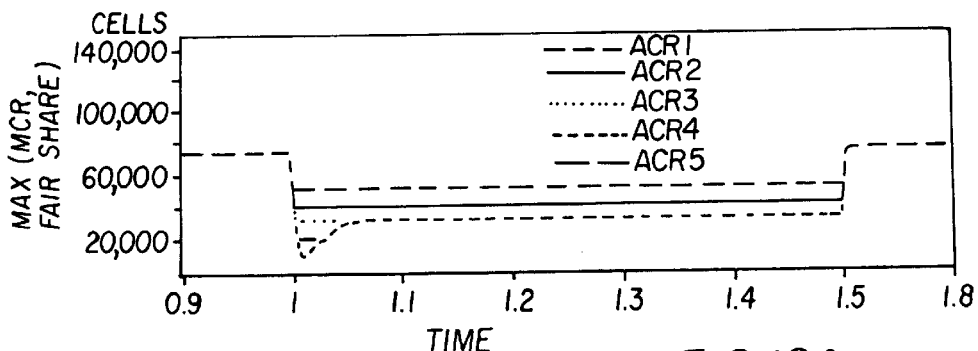
FIGS. 12A, 12B, 12C and 12D are charts illustrating a maximum cell rate fairness definition, a minimum cell rate plus fair share fairness definition, a weighted fair share fairness definition and a weighted fair share with per VC queuing fairness definition for the network of FIG. 7.
Figure 12B:
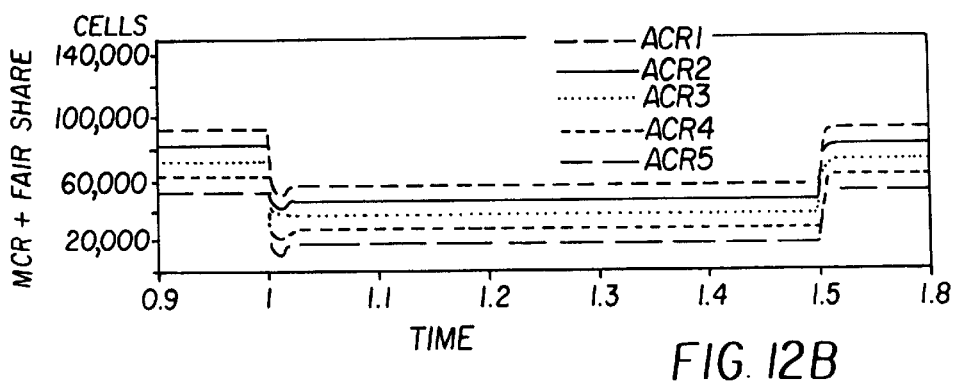
Figure 12C:
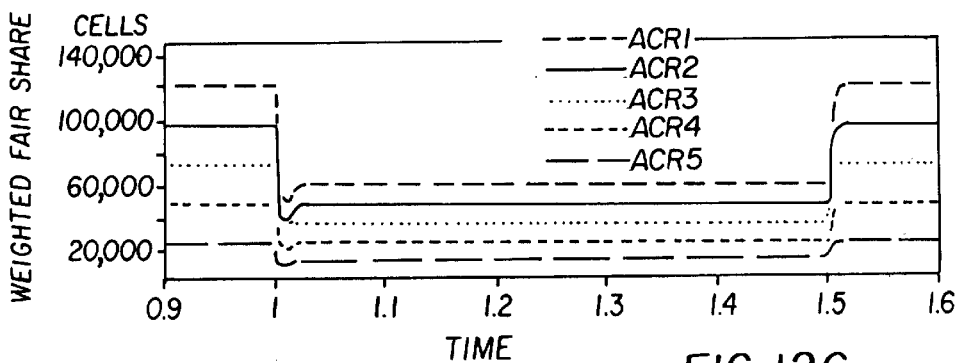
Figure 12D:
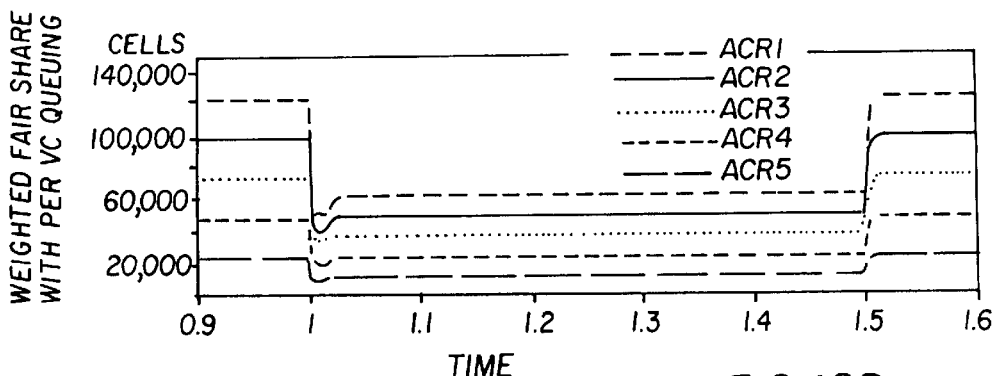

FIGS. 8A–8C, FIGS. 9A–9C, and FIGS. 10A–10C show the results for fairness criterion 1, 2 and 3 respectively for cases when a FIFO scheduler is used for all ABR streams and equation (15) is used for congestion control. FIGS. 11A–11C shows the results for weighted fairness with per VC SCFQ, and equation (14) is used for congestion control. FIGS. 12A–12D shows the ACR plots at a different scale for comparison. These results will now be described.

At equilibrium, full utilization is maintained, and since $\epsilon$ is zero, the queue lengths in all cases are close to zero. The queue buffer resources are used only to absorb transient fluctuation. Notice that in the case of fairness criterion 1 shown in FIGS. 8A–8C, the transient performance is slower than in the other cases around time 1 s as shown in FIGS. 12A–12D. This is a result of even sharing of spare capacity by the number of active connections determined using equation (13). In this case, not every connection can respond by increasing its rate, since the transient fair rate is lower than the MCR of some sources. In the case of weighted fairness, per VC control seems to provide a slightly better transient behavior. However, because of the normalization of the queue length in the FIFO case, the performance gain is not significant.

Figure 13:
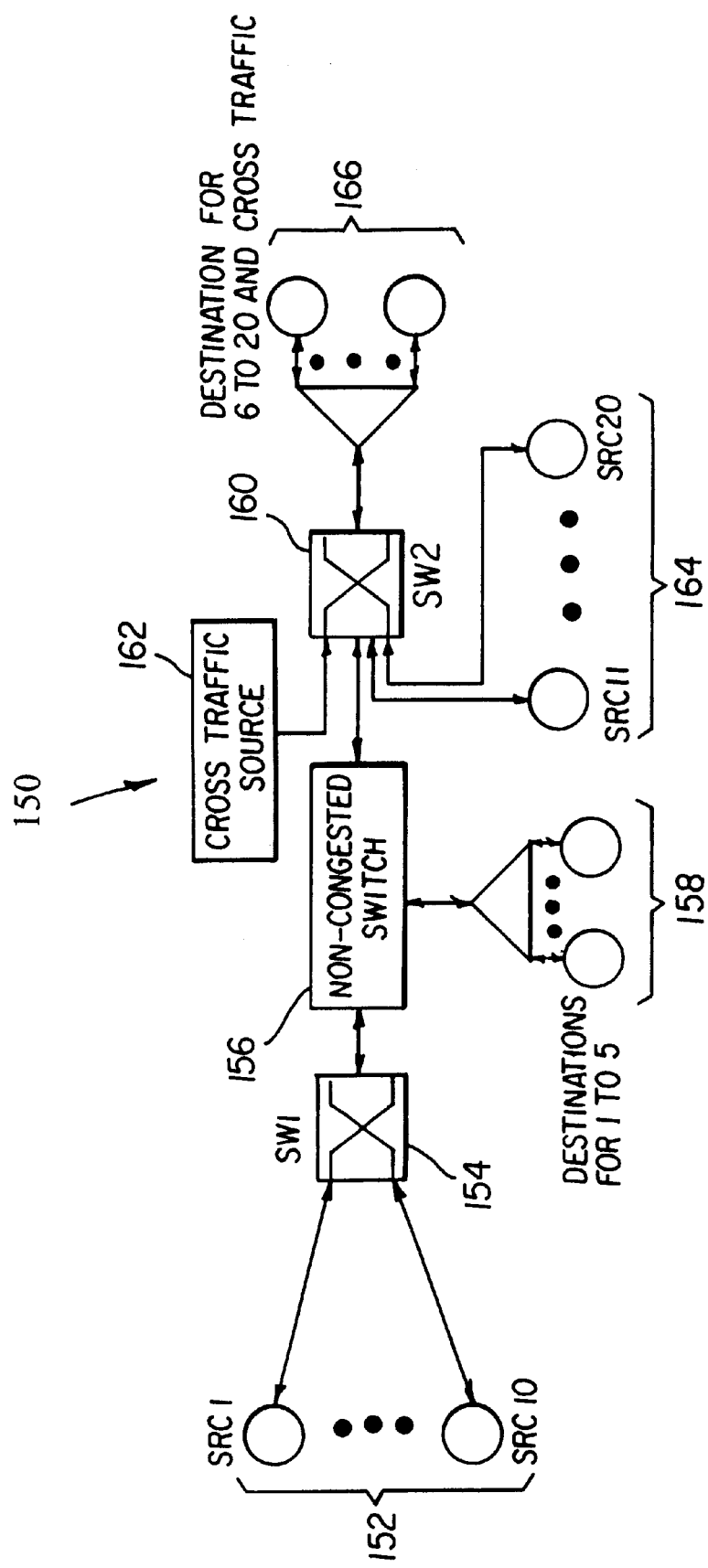
FIG. 13 is a diagram illustrating a second example of a network configuration that may operate with the system and method in accordance with the invention.
Figure 14A:
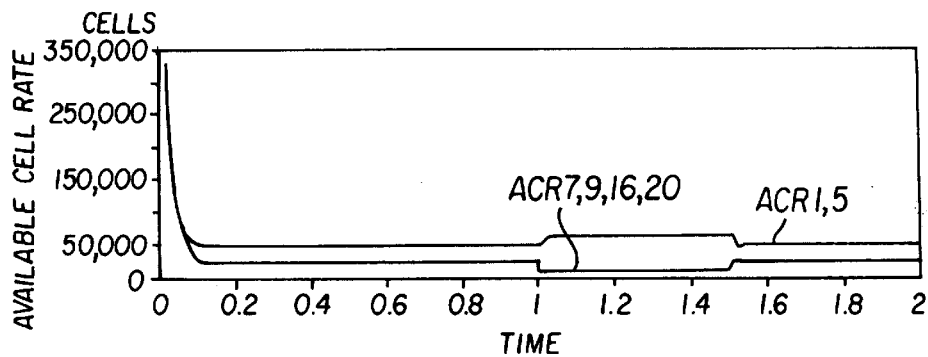
FIGS. 14A, 14B, 14C, and 14D are charts illustrating the available cell rate, the switch port queue length, the utilization, and the number of active users for the network of FIG. 13 using a minimum cell rate and fair share fairness definition.
Figure 14B:
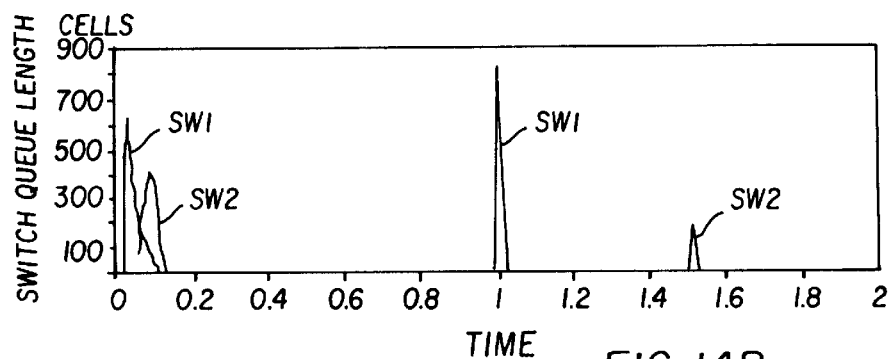
Figure 14C:
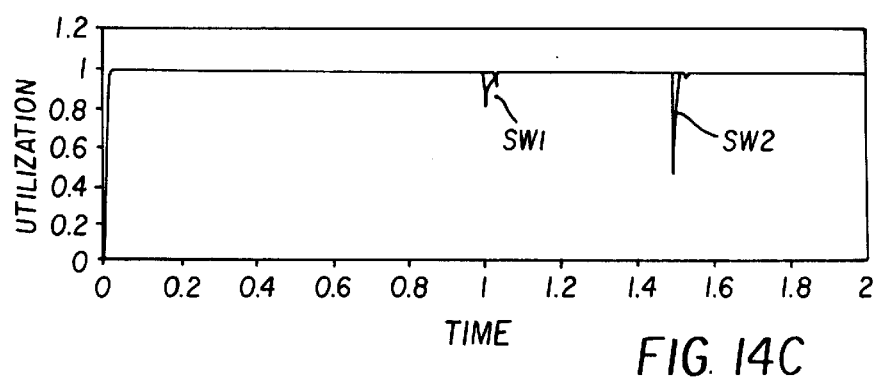
Figure 14D:
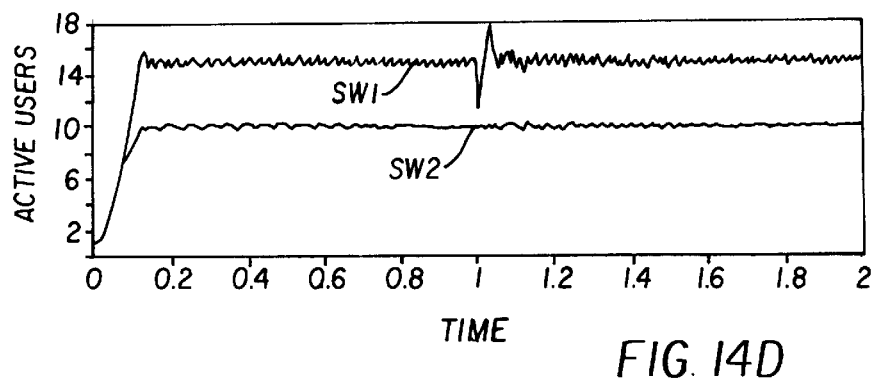
Figure 15A:
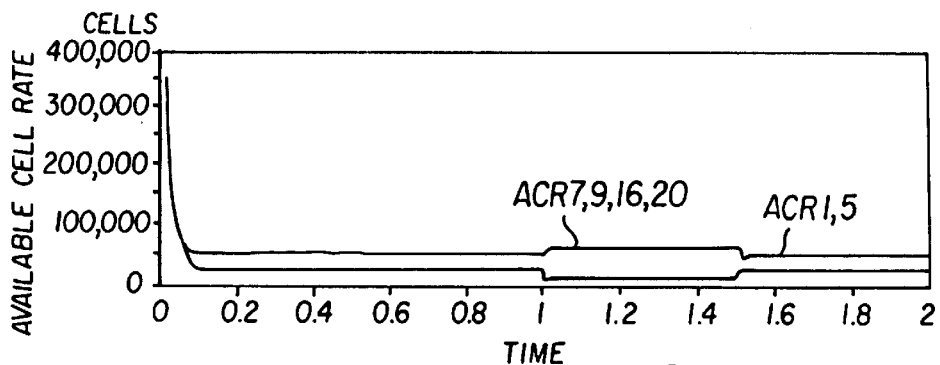
FIGS. 15A, 15B, 15C, and 15D are charts illustrating the available cell rate, the switch port queue length, the utilization, and the number of active users for the network of FIG. 13 using a minimum cell rate and fair share fairness definition with an approximation of Na.
Figure 15B:
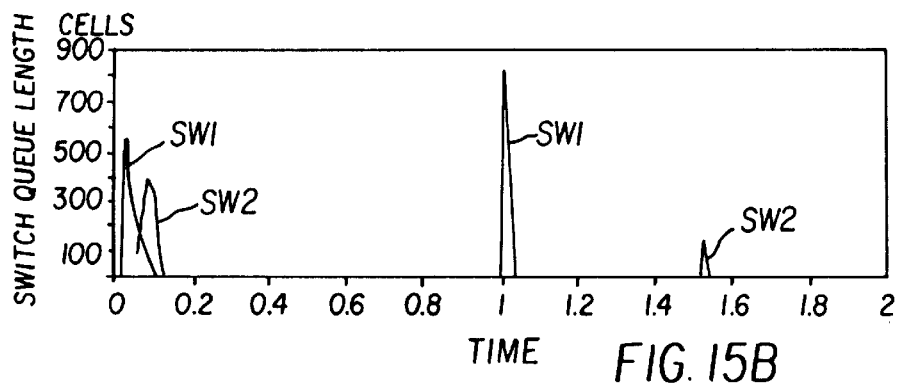
Figure 15C:
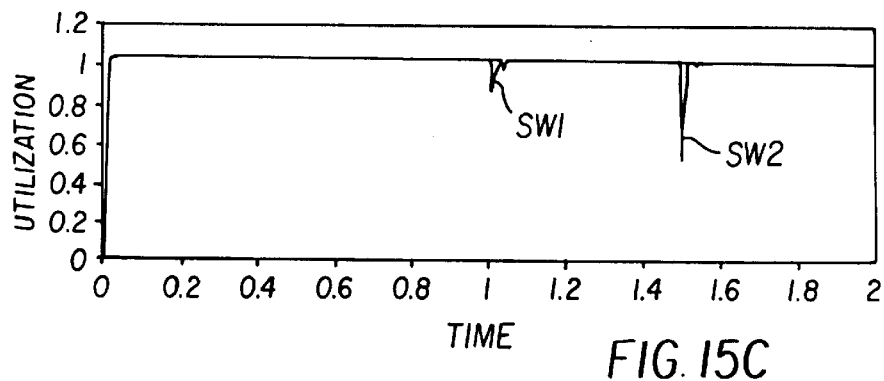
Figure 15D:
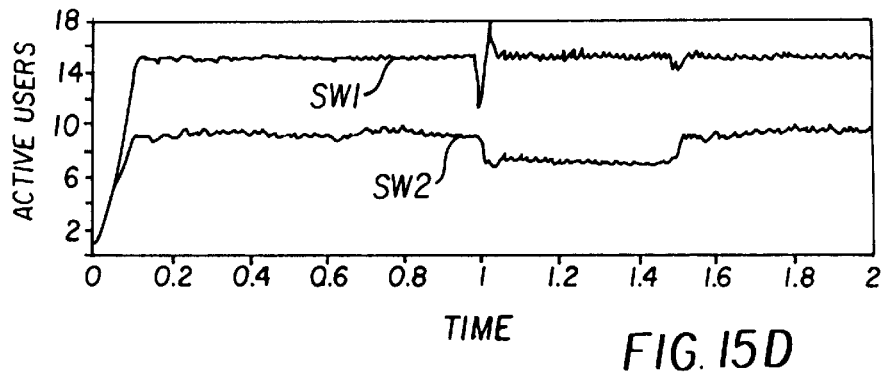

Now, a network configuration having multiple bottleneck nodes is described. A network configuration 150 is shown in FIG. 13 and has multiple sources 152, such as SRC1–SRC10, connected to a first switch 154 which is in turn connected to a non-congested switch 156. The non-congested switch may be connected to a plurality of destinations 158 for the first 5 sources and a second congested switch 160. The second congested switch may also be connected to a cross traffic source 162 as described above, a plurality of ABR sources 164, such as SRC11–SRC20, and a plurality of destinations 166 for the last 15 sources. The capacities of all the links are 155 Mbps. There are a total of 20 sources. Sources 1 to 5 pass through switch 1 only, sources 6 to 10 pass through both switch 1 and 2, and sources 11 to 20 pass through only switch 2. The cross traffic is again a higher priority CBR source that turns on at 1 s and turns off at 1.5 s. When it is on, the CBR source sends at 50% of the link capacity. The propagation delay between the two switches is 4 ms corresponding to a distance of about 800 Km. We only consider the second fairness criterion (MCR plus fair share). In addition, two estimates of Na are considered. The first case uses a more accurate Na estimate, whereas the second case uses a less accurate estimate of NA derived from equation (27). The following two tables summarizes the simulation parameters. The MCR and initial cell rate (ICR) values of the sources are 10,000 Cell/s and 20,000 Cell/s respectively.

TABLE 4

Source parameters for network configuration 2.

| Source ID | Source to Switch Delay (ms) | Start Time (s) |
|---|---|---|
| 1,11 | 0.5 | 0.01 |
| 2,12 | 0.4 | 0.02 |
| 3,13 | 0.3 | 0.03 |
| 4,14 | 0.2 | 0.04 |
| 5,15 | 0.1 | 0.05 |
| 6,16 | 0.5 | 0.06 |
| 7,17 | 0.4 | 0.07 |
| 8,18 | 0.3 | 0.08 |
| 9,19 | 0.2 | 0.09 |
| 10,20 | 0.1 | 0.10 |

TABLE 5

Parameters for the method for network configuration 2.

| | |
|---|---|
| $\alpha_{VC}$ | 512 |
| $\beta_{VC}$ | 0 |
| $\gamma_{FS}$ | 0.875 |
| $\gamma_{Na}$ | 0.875 |
| $\epsilon$ | 0 |
| Nrm | 32 |
| L | 1 ms |

Figure 16A:
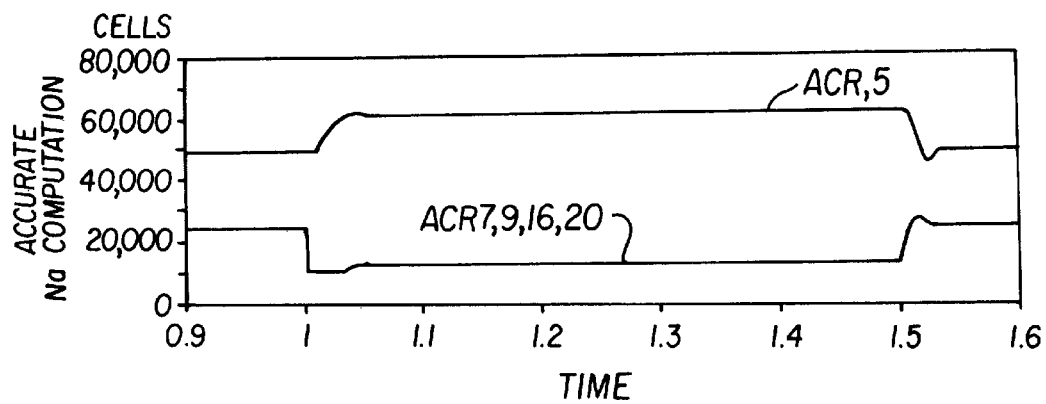
FIGS. 16A and 16B are charts illustrating the accurate Na computations and approximate Na computations for the network of FIG. 13.
Figure 16B:
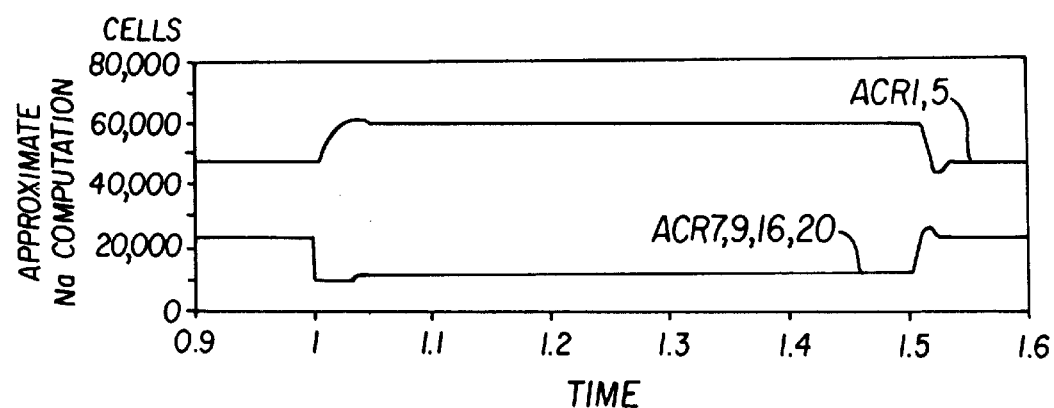

FIGS. 14A–14D and FIGS. 15A–15D summarize the results for the two cases. At equilibrium, max-min fairness is achieved, and since $\epsilon$ is zero, the queue length is close to zero. Also shown are the plots for the number of active users in the two cases. As expected, if the CCR of all VCs are close to the fair rate, the approximation is very accurate. Observe that the fair value is achieved even with the approximate Na calculation. This is because in our method, the use of Na is in the normalization of control and the redistribution of spare capacity. The actual fair share of bandwidth is independent of Na at equilibrium. FIGS. 16A and 16B shows the ACR plots at a different scale.

In summary, we introduced a novel method to calculate the explicit rate for available bit rate services. The method is uniform in that it supports all three types of fairness schemes proposed, and can be applied to both global queue control and per VC queue control when the cell scheduler fairness matches that of the flow control. Per VC queuing inherently provides selectivity in resource management, such as cell discard; in our scheme, with normalization of control, the performance gain in using per VC queuing is not significant. The fair bandwidth allocation in our method does not depend on the accuracy of the number of active users at the bottleneck node. In fact, a crude approximation can be used without performance degradation. This can provide significant reduction in implementation complexity. The choice of control parameters is rather robust in the range of network scale we investigated, which covers most of the campus backbone applications.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for controlling congestion in a network switch by controlling the transmission rate of a source connected by a virtual channel to a transmission resource within the switch, the source transmitting data at a current cell rate, the method comprising:

estimating a total number of connections connected to the transmission resource within the switch that are transmitting data through the transmission resource within the switch to generate an estimated number of active connections;

determining a fair bandwidth allocation in accordance with a predetermined fairness criteria over a predetermined interval based on the current cell rate and the minimum cell rate of all sources connected through the transmission resource within the switch and the spare bandwidth of the transmission resource for each source connected through the transmission resource;

calculating an adjusted transmission rate for a particular source connected to the transmission resource within the switch based on said current cell rate of the source, said fair bandwidth allocation, said estimated number of active connections and a queue length; and transmitting said adjusted transmission rate backwards to the particular source in order to explicitly control the transmission rate of the source and control the congestion of the network switch.

2. The method of claim 1, wherein said queue length comprises a normalized queue length which is inversely proportional to the number of active connections sharing a transmission resource.

3. The method of claim 1, wherein estimating the total number of connections comprises determining a total number of resource management cells that are received at the transmission resource during a predetermined period for each of a plurality of connections and adding the numbers resulting from multiplying the total number of resource management cells received in said predetermined period by an inverse of the current cell rate for the corresponding connection to determine an estimate for the total number of connections.

4. The method of claim 1, wherein estimating the total number of connections comprises determining a total number of resource management cells received at the transmission resource during a predetermined period for a plurality of connections and multiplying the total number with the inverse of an estimate of the fair bandwidth allocation for the connection.

5. The method of claim 1, wherein estimating the total number of connections comprises generating a weighted value for each connection to the transmission resource to generate a weighted estimate of the total number of connections to the switch.

6. The method of claim 1, wherein the allocation determination comprises determining a maximum value of a current cell rate for all connections sharing the transmission resource such that the current cell rate of a connection is greater than the minimum cell rate for that connection, and dividing the spare bandwidth of the transmission resource by the number of active connections sharing the transmission resource.

7. The method of claim 1, wherein the allocation determination comprises determining the maximum value, over the predetermined interval and over all active connections sharing the transmission resource, of a difference between a current cell rate for a connection and a minimum cell rate for that connection, and dividing the spare bandwidth of the transmission resource by the number of active connections sharing the transmission resource.

8. The method of claim 1, wherein the allocation determination comprises determining a maximum value, over the predetermined interval and over all active connections sharing the transmission resource, of a current cell rate divided by a weight associated with the connection and dividing the spare bandwidth of the transmission resource by a normalized number of active connections sharing the transmission resource, wherein said normalized number is generated by the equation $(\Sigma_J(N_{RM}/L \times W_{VC}(J)/CCR_J)$, wherein $\Sigma$ represents the sigma operation for all J cells received during the past L duration, $N_{RM}$ represents the frequency at which the resource management cells are transmitted, $W_{VC}(J)$ is a weight associated with the virtual connection to which the $J^{th}$ relates to, and $CCR_J$ represents the current cell rate on the virtual circuit to which the $J^{th}$ cell relates to.

9. A system for controlling congestion in a network switch by controlling the transmission rate of a source connected by a virtual channel to a transmission resource within the switch, the source transmitting data at a current cell rate, the system comprising:

means for estimating a total number of connections connected to the transmission resource within the switch that are transmitting data through the transmission resource within a switch to generate an estimated number of active connections;

means for determining a fair bandwidth allocation in accordance with a predetermined fairness criteria over a predetermined interval based on the current cell rate and the minimum cell rate of all sources connected through the transmission resource within the switch and the spare bandwidth of the transmission resource for each source connected through the transmission resource;

means for calculating an adjusted transmission rate for a particular source connected to the transmission resource within the switch based on said current cell rate of the source, said fair bandwidth allocation, said estimated number of active connections and a queue length; and means for transmitting said adjusted transmission rate backwards to the particular source in order to explicitly control the transmission rate of the source and control the congestion of the network switch.

10. The system of claim 9, wherein said queue length comprises a normalized queue length which is inversely proportional to the number of active connections sharing the transmission resource.

11. The system of claim 9, wherein said estimation means comprises means for determining a total number of resource management cells that are received at the transmission resource during a predetermined period for each of a plurality of connections and means for adding the numbers resulting from multiplying the total number of resource management cells received in said predetermined period by an inverse of the current cell rate for the corresponding connection to determine an estimate for the total number of connections.

12. The system of claim 9, wherein said estimating means comprises means for determining a total number of resource management cells received at the transmission resource during a predetermined period for a plurality of connections and means for combining such number with the inverse of an estimate of the fair bandwidth allocation for the connection.

13. The system of claim 9, wherein said estimating means comprises means for generating a weighted value for each connection to the switch to generate a weighted estimate of the total number of connections to the transmission resource.

14. The system of claim 9, wherein said allocation determination means comprises means for determining a maximum value of a current cell rate for all connections sharing the transmission resource such that the current cell rate of a connection is greater than the minimum cell rate for that connection, and means for dividing the spare bandwidth of the transmission resource by the number of active connections sharing the transmission resource.

15. The system of claim 9, wherein the allocation determination means comprises means for determining the maximum value, over the predetermined interval and over all active connections sharing a transmission resource, of a difference between a current cell rate for a connection and a minimum cell rate for that connection, and means for dividing the spare bandwidth of the transmission resource by the number of active connections sharing the transmission resource.

16. The system of claim 9, wherein the allocation determination means comprises means for determining a maximum value, over the predetermined interval and over all active connections sharing the transmission resource, of a current cell rate divided by a weight associated with the connection and means for dividing the spare bandwidth of the transmission resource by a normalized number of active connections sharing the transmission resource, wherein said normalized number is generated by the equation $(\Sigma_J(N_{RM}/L \times W_{VC}(J)/CCR_J)$, wherein $\Sigma$ represents the sigma operation for all J cells received during the past L duration, $N_{RM}$ represents the frequency at which the resource management cells are transmitted, $W_{VC}(J)$ is a weight associated with the virtual connection to which the $J^{th}$ relates to, and $CCR_J$ represents the current cell rate on the virtual circuit to which the $J^{th}$ cell relates to.

* * * * *